United States Patent [19]

Yamaguchi et al.

[11] 4,290,301

[45] Sep. 22, 1981

[54] KNOCK DETECTING APPARATUS FOR INTERNAL COMBUSTION ENGINE

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 95,673

[22] Filed: Nov. 19, 1979

[30] Foreign Application Priority Data

Apr. 18, 1979 [JP] Japan .................................. 54/47560

[51] Int. Cl.³ ............................................. G01L 23/22
[52] U.S. Cl. .......................................... 73/35; 73/651
[58] Field of Search ....................... 73/35, 651; 310/25

[56] References Cited

U.S. PATENT DOCUMENTS

| | | | |
|---|---|---|---|
| 1,907,415 | 5/1933 | Carpenter et al. ................. | 73/35 X |
| 1,948,104 | 2/1934 | Firestone et al. .................... | 73/651 |
| 2,424,864 | 7/1947 | Treseder ............................... | 73/651 |
| 4,161,665 | 7/1979 | Buck et al. ........................... | 73/35 X |

*Primary Examiner*—James J. Gill
*Attorney, Agent, or Firm*—Cushman, Darby & Cushman

[57] ABSTRACT

A knock detecting apparatus for an internal combustion engine includes a vibrating reed of magnetic material. One end of the vibrating reed is fastened to a supporting member interposing therebetween a magnet and one end of a core. The free end of the vibrating reed confronts with the other end of the core with an air gap therebetween to form a magnetic path including the magnet, vibrating reed, air gap and core. As the vibrating reed vibrates in response to vibration of the engine on which the supporting member is securely mounted, the distance of the air gap changes causing a change in magnetic flux passing through the magnetic path. The change of magnetic flux is detected by a coil wound on the core. The resonance characteristic of the vibrating reed is arranged to fall in the frequency range of the knocking.

5 Claims, 15 Drawing Figures

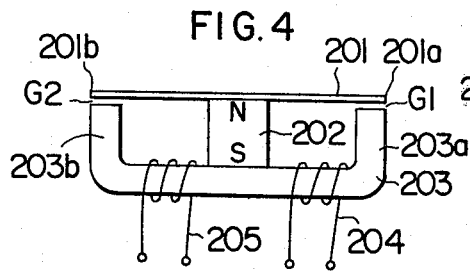
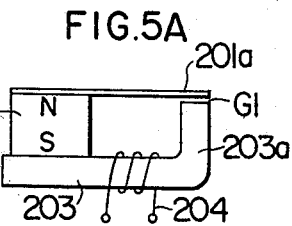
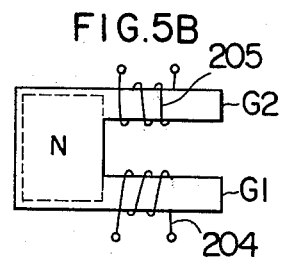
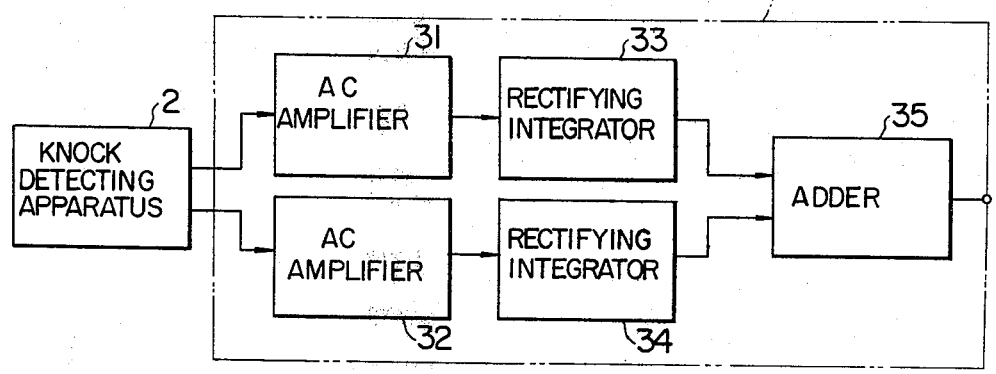
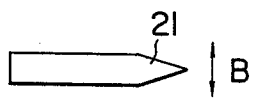
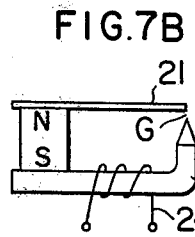
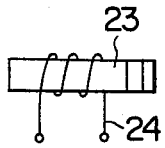
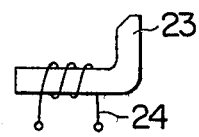
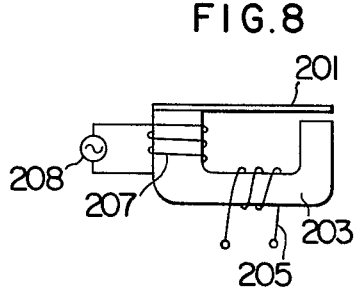
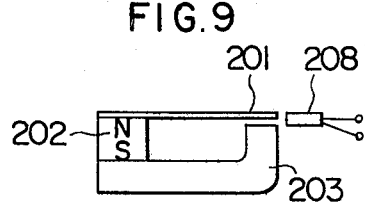

KNOCK DETECTING APPARATUS FOR INTERNAL COMBUSTION ENGINE

BACKGROUND OF THE INVENTION

1. FIELD OF THE INVENTION

The present invention relates to a knock detecting apparatus adapted for use with internal combustion engine ignition timing control systems, etc., which are designed to function so that knock is detected from the vibration produced outside the engine cylinders due to the cylinder pressure and the ignition timing is controlled so as to obtain the desired knock intensity.

2. DESCRIPTION OF THE PRIOR ART

It is known in the art that there is a close correlation between the ignition timing and the cylinder pressure. When a mixture is burned, in the absence of knocking there is no superposition on the cylinder pressure of any higher harmonic component (usually a frequency component in the range of 5 to 10 kHz which falls in the frequency band determined by the engine cylinder bore diameter and the velocity of sound in the combustion and which is produced by the intermittent and rapid combustion), whereas when knocking occurs such higher harmonics start to superpose on the cylinder pressure at around the maximum cylinder pressure and this results in the generation of vibration or sound outside the cylinder. Examination of the pressure signals generated inside the cylinders and the generation of the vibrations or sound outside the cylinders shows that the beginning of knock (trace knock) starts to occur at an engine crank angle at which the cylinder pressure attains the maximum value and that as the knock is gradually increased (to light knock and heavy knock) the higher harmonic starts to superpose considerably earlier (or on the ignition side) than the maximum cylinder pressure crank angle. Thus, if the vibration or sound produced outside the cylinders by the knock is detected with a high degree of accuracy and then fed back to control the ignition timing, the engine efficiency will be improved greatly. In fact, however, there has been no detecting apparatus which is not only capable of accurately detecting the condition of knocking or a feedback factor but also operable stably under severe surrounding conditions required for vehicles.

A known detecting apparatus of the above type employs a piezoelectric type acceleration sensor to detect the knocking vibration caused in an engine. However, this type of detecting apparatus still has many deficiencies with respect to the following requirements or characteristics which must be met by a knock detecting apparatus for internal combustion engines.

(1) Since the knock in an engine increases in severity as the ignition timing is advanced as mentioned previously, the desired knock control level for ignition timing control purposes must be lower than the trace knock level and it is essential for the apparatus to possess highly accurate and stable detection characteristics. However, the piezoelectric element is essentially a high impedance element and its characteristics tend to be affected by humidity and contamination, thus making it difficult to stably generate a small signal indicative of trace knock (the drift and amplitude variations are high). Further, since the piezoelectric characteristic of the element is provided by polarization and since the working conditions are severe in that they change cyclically from the high to low temperature condition, the polarization tends to loss gradually with the resulting reduction in the sensitivity. The reduced sensitivity results in a rise in the knock control level and this occasionally causes damage to the engine due to the knock.

(2) The detecting apparatus should preferably be low in the manufacturing cost. However, the piezoelectric element has a high input impedance and consequently an expensive amplifier of the high impedance input type which is called as a charge amplifier must be used for amplifying the output signal of the piezoelectric element. The high impedance type amplifier tends to malfunction under the effect of noise caused by the engine ignition noise or the like and consequently the construction must be made more expensive and complicated to overcome this difficulty.

(3) The piezoelectric element is disadvantageous for use as a vehicle-mounted detector from the stand-point of durability, cost, etc., in that the elements is low in shock resistance, tends to be subjected to cracking, breaking, etc., and requires cooling means or the like for using the element at high temperatures.

SUMMARY OF THE INVENTION

It is the object of the invention to provide an improved knock detecting apparatus which is high in efficiency, low in cost and light in weight.

In accordance with the invention there is thus provided a knock detecting apparatus comprising reed means made of a magnetic material and disposed to form a magnetic path with an air gap, energizing means and magnetic flux detecting means. The resonance frequency of the reed means can be easily matched against the knocking higher harmonic, with the result that the sensitivity of the detecting apparatus to the knocking frequency can be improved remarkably and the detection sensitivity to the vibration noise inevitably generated from the engine body (e.g., valve seating vibration) can be reduced comparatively, thus improving the S/N ratio and making possible the detection of very low knock levels. Further, since the apparatus is operated magnetically, its component parts can be comprised of a coil, magnet, etc., which are excellent in environmental resistance thus satisfactorily meeting the severe working conditions required by vehicle and moreover there are further advantages, such as, the elimination of deterioration in the characteristics, stability in operation, elimination of cracking and breaking of the elements and sufficient mechanical strength. The detection of signals can be effected by a coil, magneto-resistance element or the like which is magnetically sensitive and the detecting means of a low impedance type which is contrary to the high impedance piezoelectric element. Thus, the knock detecting apparatus of this invention is excellent from the standpoint of performance, cost and weight in that the apparatus is practically not affected by humidity, etc., highly stable in operation against such electric noise as ignition noise, simple in construction and allows the use of mass-produced inexpensive materials for its component parts.

BRIEF DESCRIPTION OF THE DRAWINGS

FIG. 4 is a schematic front view showing a second embodiment of the apparatus according to the invention.

FIGS. 5A and 5B are respectively a schematic front view and a schematic plan view showing a third embodiment of the apparatus according to the invention.

FIG. 6 is a block diagram showing an embodiment of the principal parts of a knock detecting circuit used with the ignition system shown in FIG. 1.

FIGS. 7A and 7B are respectively a front view of a reed member and a schematic overall front view showing a fourth embodiment of the apparatus according to the invention.

FIGS. 7C, 7D and 7E are respectively a front view of a reed, a schematic plan view of a core and coil and a schematic front view showing a fifth embodiment of the apparatus according to the invention.

FIGS. 8 and 9 are schematic front views showing respectively a sixth and a seventh embodiment of the apparatus according to the invention.

DESCRIPTION OF THE PREFERRED EMBODIMENTS

The present invention will now be described in greater detail with reference to the illustrated embodiments.

Figure 1:
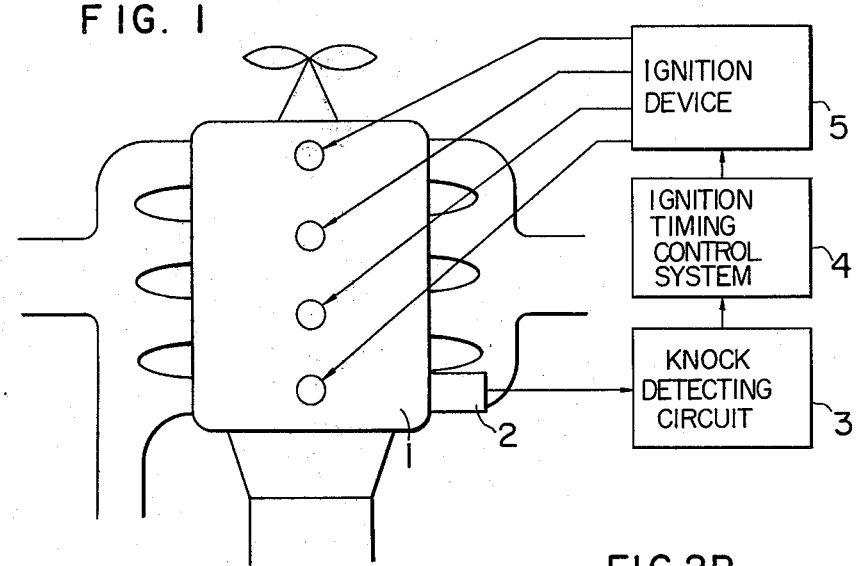
FIG. 1 is a schematic block diagram showing the construction of a knock feedback ignition system incorporating a knock detecting apparatus according to the invention.

Referring first to FIG. 1, there is illustrated a schematic block diagram of a feedback ignition system incorporating a knock detecting apparatus according to the invention. In the Figure, numeral 1 designates a four-cylinder in-line type internal combustion engine, and a knock detecting apparatus 2 is mounted to the cylinder block of the engine 1 with such means as a screw. Numeral 3 designates a knock detecting circuit for detecting knocking of the engine from the output signal of the knock detecting apparatus 2, and 4 an ignition timing control system responsive to the output of the detecting circuit 3 to advance or retard the ignition timing and control it to the optimum advance. The output signal of the control system 4 ignites the mixture through a known type of ignition device 5 and the spark plugs mounted in the engine 1. The knock detecting circuit 3 used in this feedback ignition system detects an ignition signal which is not shown whereby the noise component due to the engine vibration is sampled in response to the output of the detecting apparatus 2 during a predetermined time or degrees or crankshaft rotation just following the ignition where there is no occurrence of knock, and the ratio of the sampled output to the output of a sensor during a predetermined time or degrees of crankshaft rotation after the top dead center (after the peak cylinder pressure) where the tendency to knock is high (the integrated value or the averaged value may be used) is detected to detect the presence of knocking. Alternatively, instead of determining the presence of knocking simply by means of a single signal, the determination may be made on the basis of probability. (For example, the presence of knocking may be determined on the basis of the percentage of the occurrences of knock in every 100 times of ignition). The ignition timing control circuit advances or retards the ignition timing depending on the presence or absence or knocking. The detailed constructions of the knock detecting circuit 3 and the ignition timing control system 4 are known in the art and will not be described. It is evident that the knock detecting apparatus of this invention can be used with any of system provided that they are designed to control the ignition timing by detecting the occurrence of knocking.

Figure 2A:
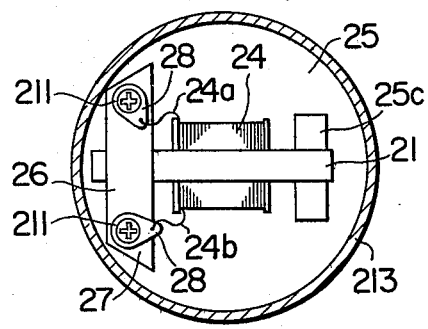
FIGS. 2A and 2B are respectively a cross-sectional view and a longitudinal sectional view showing a first embodiment of the apparatus according to the invention.
Figure 2B:
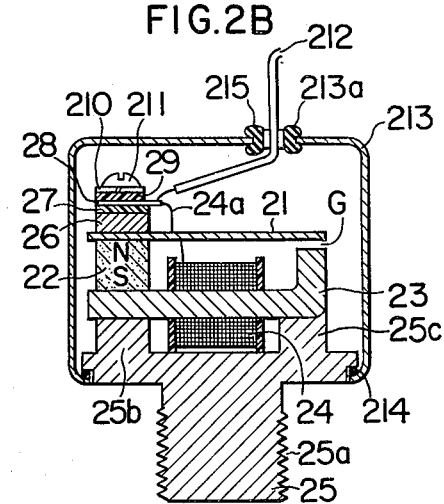

Next, the knock detecting apparatus will be described in detail. Referring to the first embodiment shown in FIGS. 2A and 2B, numeral 21 designates a reed member made of a magnetic material (e.g., iron or iron-nickel alloy) having a resonance point at which resonance occurs with the knocking frequency ranging from 5 to 10 kHz, 22 a magnet having a magnetic force, and 23 an L-shaped core made of a material such as iron, iron-nickel alloy or ferrite for forming a magnetic path together with the reed member 21 and the magnet 22. The magnetic path is formed with an air gap G located between the reed member 21 and the core 23. Consequently, when the reed member 21 vibrates, the gap G changes with the resulting change in the reluctance of the magnetic path. Numeral 24 designates a coil for detecting the change in the magnetic flux. The coil bobbin is formed with an opening so that the core 23 is extended through the central portion of the bobbin and the conductor of the coil is wound on the outer surface of the bobbin. The bobbin is fastened to the core 23 by such means as adhesion so as to prevent a change in the relative position of the coil 24 and the core 23 and hence a change in the number of magnetic lines of force passing through the magnetic path. Numeral 25 designates a housing made of iron, brass or the like comprising in the lower part a threaded portion 25a for mounting the apparatus to the engine cylinder block and in the upper part supporting portions 25b and 25c on which the core 23 is mounted. Numeral 26 designates a press bar for holding in place the component parts forming the magnetic path, whereby one end of the reed member 21, the magnet 22 and the core 23 as well as insulating sheets 27 and 29, lug pieces 28 for mounting coil output terminals 24a and 24b and a washer 210 are firmly secured to the supporting portion 25b of the housing 25 by means of small screws 211. The coil output terminals 24a and 24b are fixed to the lug pieces 28 by soldering or caulking and then brought out to the outside by lead wires 212. Numeral 213 designates a cover attached by caulking to the housing 25 with a sealing member 214 made of rubber or the like interposed therebetween, and 213a openings through which the lead wires 212 are brought out to the outside. Numeral 215 designates rubber bushings through which the lead wires 212 are passed. The detecting apparatus 2 is firmly mounted to the cylinder block by the threaded portion 25 so as to vibrate together with the cylinder block.

The operation of the detecting apparatus 2 will now be described. As mentioned previously, the detecting apparatus 2 is mounted to the cylinder block by screwing the threaded portion 25a thereinto. The knocking vibration caused in the cylinder block is transmitted to the reed member 21 by way of the housing 25. Since the reed member 21 is fixed only at one end thereof, the reed member 21 vibrates in dependence on the magnitude of this vibration frequency as well as the proper vibration of the reed member itself. In this case, since the core 23, the coil 24 and the magnet 22 are firmly mounted to vibrate along with the housing 25 as a unit, the reed member 21 alone is caused to vibrate relatively in the magnetic path in response to the knocking vibration and thus the length of the air gap G changes in accordance with the knock. In this connection, it is preliminarily designed so that the magnet 22 causes a predetermined magnetic flux to pass through the core 23 and the reed member 21 and a change in the air gap G results in a change of the number of magnetic lines of force passing through the magnetic path. The coil 24 detects this flux change or the knocking vibration in the form of a voltage. The detected voltage signal is supplied to the knock detecting circuit 3 through the lead wires 212. The reed member 21 is designed so that its resonance point is usually selected about 8 kHz with respect to the knocking frequency (7 to 10 kHz) so that in this frequency band the knock detecting sensitivity is particularly improved and the sensitivity to signals of other frequency bands is deteriorated, thus improving the S/N ratio.

Figure 3:
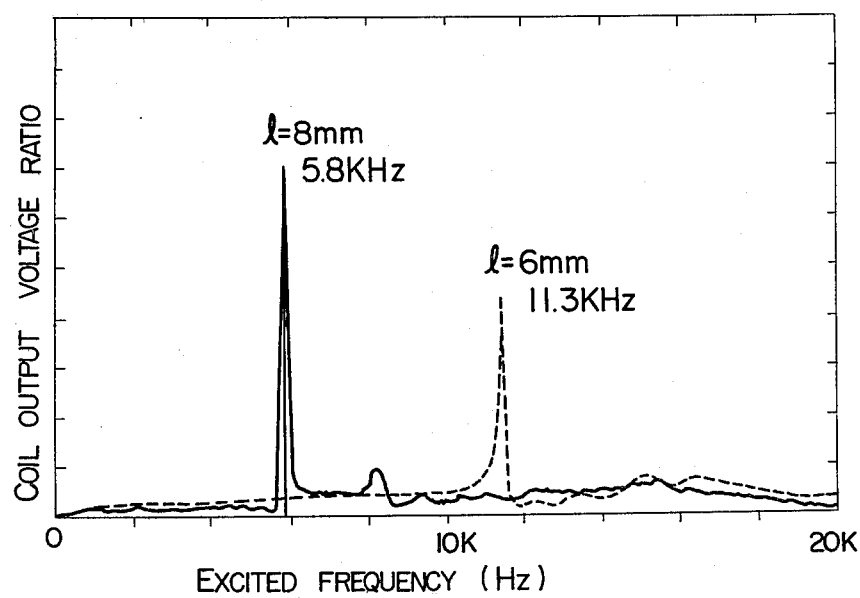
FIG. 3 is an output characteristic diagram of the detecting apparatus shown in FIGS. 2A and 2B.

FIG. 3 is a characteristic diagram showing the results of the actual measurements of the resonance point made on the detecting apparatus of the invention, that is, the resonance frequency of the detecting apparatus was measured by coupling it to a vibrator and by changing the length l of the reed member 21 and the solid and broken lines respectively indicate the characteristics obtained with the length l=8 mm and l=6 mm, respectively. In the Figure, the coil output voltage ratio represents the output of the detecting apparatus per unit acceleration. It will readily be seen from this output characteristic diagram that the detecting apparatus has an excellent sensitivity to the knocking frequency and the S/N ratio is also excellent. In other words, the fact that the output increases (or has a resonance point) with respect to a specified frequency in the range of 0 to 20 kHz means the deteriorated sensitivity to the other frequencies, the elimination of malfunctions and less tendency of other noise components to occur in this knocking frequency band. In the detecting apparatus of this invention, the magnetic force of the magnet 22 acts across the air gap G so that the resulting attractive force pulls the reed member 21 in one direction and thus the apparatus also has a vibration characteristic with a damping characteristic. This also has an effect that as soon as the knocking stops (the knock occurs at a specified crank angle as mentioned previously), the attractive force acts in a direction to stop the vibration of the reed member 21 and the detecting apparatus generates an output only in the region where the knock is taking place. This damping characteristic increases in effect with an increase in the magnetic force.

FIG. 4 is a schematic diagram showing a second embodiment of the knock detecting apparatus comprising a pair of reed members arranged in the opposed positions and having the same resonance frequency. The output of the knock detecting apparatus should preferably be excellent in S/N ratio and high in output voltage. In the Figure, numeral 201 designates reed means and air gaps $G_1$ and $G_2$ are formed in the opposed positions at its ends. The reed means 201 may consist of a single sheet or may be divided into two parts without causing any problem provided that it is firmly mounted in place. Numeral 202 designates a magnet supporting the reed means 201 at its central portion, and 203 a core consisting of a C-shaped magnetic material. One magnetic flux passes through a magnetic path formed by the north pole of the magnet 202, one side 201a of the reed means 201, the gap $G_1$ and one side 203a of the core 203 and the other magnetic flux passes through another magnetic path formed by the other side 201b of the reed means 201, the gap $G_2$ and the other side 203b of the core 203. Numerals 204 and 205 designate coils respectively wound on the sides 203a and 203b of the core 203 and the coils are connected in series with each other in such a manner that the voltages produced in the coils 204 and 205 by the vibration of the reed means 201 are in phase. The mounting method of the reed means 201, the coils 204 and 205 and the core 203 is of the same type as the first embodiment, that is, the central portion of the magnet 202 is firmly fixed in place by means of a press plate or the like and small screws and the opposed sides of the reed means 201 are alone allowed to vibrate relatively. The operation of this detecting apparatus is such that when the entire apparatus vibrates due to the knock, the gaps $G_1$ and $G_2$ change in the same phase relation so that the sum of the output voltages of the coils 204 and 205 is generated from the detecting coils 204 and 205 and this addition of the outputs have the effect of increasing the detection sensitivity two times. In the case of the vibration components (e.g., those caused by the twisting of the engine) which do not result in the same phase for the gaps $G_1$ and $G_2$, no output will be produced and the directivity of the vibration output is improved.

Differing from the second embodiment of FIG. 4 in which the two magnetic paths respectively including the gaps $G_1$ and $G_2$ are arranged at opposite positions, in the third embodiment shown in FIGS. 5A and 5B the magnetic paths including the gaps $G_1$ and $G_2$ are arranged parallel to each other. In the Figures, the reed member 201a is produced from the same plate by stamping and the entire magnetic path is arranged in parallel. While the operation is the same with the embodiment of FIG. 4, this arrangement has the effect of reducing the size of the detecting apparatus on the whole.

FIG. 6 is a block diagram showing a part of the input processing circuit of the knock detecting circuit 3 which is adapted for use in cases where it is desired to obtain a complete sum output of the detecting apparatus comprising a plurality of the same resonant units. Where two coil outputs are added directly, if there occurs a difference in phase (which may also be considered as resonance point) between the signals, they will cancel each other. While this method usually results in a simple construction and ensures an improved noise suppression and reduced cost, if only the improved sensitivity to signals is desired, the system of FIG. 6 may be used. In the Figure, numeral 2 designates a knock detecting apparatus having two coils 204 and 205 as shown in FIG. 4 or 5, 31 and 32 AC amplifiers adapted to respectively amplify the outputs of the coils 204 and 205, and 33 and 34 rectifying integrators adapted to respectively rectify and integrate the outputs of the AC amplifiers 31 and 32. The output voltages of the integrators 33 and 34 are applied to an adder 35. As a result, there is no danger of cancellation of the AC signals and a perfect addition of the signals can be performed.

On the other hand, the sensitivity of the detecting apparatus differs depending on the shape of the gap G.

FIGS. 7A and 7B show a fourth embodiment in which the reed member 21 and the core 23 forming the gap G are each made narrow at one end to improve the concentration of magnetic flux and the magnetic flux is caused to change more with a change in the gap with the resulting improvement on the sensitivity. In this case, while the sensitivity will be improved with decrease in the size of the ends, the sensitivity will be improved not only in the direction of A in which the detection of vibrations is essentially desired but also to the vibrations in the direction of B. Thus, if one end of the core 23 having a fixed width is formed into a wedge shape as shown in FIGS. 7C, 7D and 7E, the sensitivity in the direction B will be deteriorated with the resultant improvement on the S/N ratio.

While, in the embodiments described above, a magnet is used to apply a magnetic force to reed means, the desired energization may also be effected by a coil. FIG. 8 shows a sixth embodiment in which the core 203 is formed into a C-shape and a coil 207 wound on the core 203 is energized by an oscillator 208 to generate the desired magnetic force. Further, in FIG. 8, if the detecting coil 205 is eliminated and if the oscillator 208 connected to the coil 207 is of a type which is low in oscillation strength, the vibration of the reed member 201 changes the load of the oscillator 208 and the vibration is detected in terms of a change in the oscillator output.

Since the present invention employs a detection system which utilizes changes in magnetic flux, a magneto-resistance element 208 responsive to magnetism or other element having a relatively low impedance, such as a Hall device may be used as in the case of the seventh embodiment shown in FIG. 9. In this case, however, it is necessary to use one which stably operates at a working temperature in the range of 100° to 120° C.

It will thus be seen from the foregoing that in accordance with the invention, by virtue of the fact that a detecting apparatus comprises a reed member having a resonance point corresponding to the knocking frequency, a magnetic path with an air gap, means for magnetizing the magnetic path and magnetic flux detecting means, there are a number of great advantages which may be summarized as follows.

(1) Not only the resonance frequency of the reed member can be easily matched against the knocking frequency depending on the length of the reed member with the resulting great improvement on the sensitivity of the apparatus to the knocking, but also the sensitivity to such vibration noise as will be inevitably caused by the operation of the engine (e.g., vibration due to the valve seating) can be reduced comparatively with the resulting improvement on the S/N ratio, and moreover the detection of very small or trace knock is made possible.

(2) Due to the use of the magnetically operated detecting means, the component parts of the apparatus can be comprised of a coil, magnet, etc., which are excellent in environmental resistance, thus satisfactorily meeting the severe environmental conditions of vehicles, eliminating the deficiencies which have been encountered in the use of a piezoelectric element, such as the drift of signals, cracking, breaking or the like of the element caused by the ambient temperature, and moreover a sufficient mechanical strength is ensured.

(3) Since the coil or the magneto-resistance element is much lower in impedance than the piezoelectric element and less susceptible to the effect of ignition noise and since there is no need to use a charge amplifier for the amplifiers, there is no danger of the charge leakage due to contamination, humidity, etc., and thus the apparatus is low in cost and excellent in stability.

(4) Since the materials are not high in cost compared with the piezoelectric element and the materials are also excellent in mass productivity and durability, the apparatus is highly efficient, low in cost and excellent in durability and it is capable of detecting low intensity knock such as trace knock.

We claim:

1. A knock detecting apparatus for internal combustion engines comprising:
   magnetic path means including reed means of magnetic material disposed to vibrate in response to vibration of a combustion engine and at least one air gap formed in close proximity to said reed means, wherein said magnetic path means comprises two magnetic paths each including a reed member of the same length to exhibit the same resonance characteristic;
   magnetic flux detecting means disposed to detect a change in reluctance of said magnetic path means caused by a change in the length of said air gap due to the vibration of said reed means, said reed means having a characteristic so as to be resonant at the frequency of knock, wherein said magnetic flux detecting means comprises two magnetic flux detectors each thereof being disposed to detect a change in the reluctance in respective magnetic paths; and
   a knock detecting circuit including two integrators for integrating the output signals of said magnetic flux detectors respectively and an adder for adding the output signals of said integrators.

2. A knock detecting apparatus for combustion engines comprising:
   housing means having an axially extending threaded portion engageable with a combustion engine;
   magnetic means arranged in secured relation to said housing means and magnetized in the axial direction of said threaded portion for generating a magnetic flux;
   permeable core means arranged in secured relation between said magnet means and said housing means at one side thereof;
   permeable reed means extending perpendicular to the axis of said threaded portion and arranged to form a magnetic path for the magnetic flux in association with said permeable core means, one end of said permeable reed means being arranged in secured relation to said magnet means and the other end of said permeable reed means being arranged to form a gap in said magnetic path relative to the other end of said core means to thereby change the magnetic flux passing through said magnetic path in response to the change in said gap; and
   coil means wound on said permeable core means for generating an electric signal in response to the change in the magnetic flux passing therethrough.

3. A knock detecting apparatus according to claim 2, wherein said core means has a central portion extending perpendicular to the axis of said threaded portion and two side portions extending from the respective ends of said central portion in the axial direction of said threaded portion, wherein said magnet means is positioned at the center of said central portion of said core means, wherein said permeable reed means comprises serially extending first and second permeable reeds of the same length each having one end arranged in secured relation to said magnet means and the other end arranged to form the air gap relative to the end of said side portions of said core means, and wherein said coil means comprises first and second coils wound on said permeable core means at respective central portions of said core means spaced by said magnet means, said first and second coils being connected in series to each other to thereby add the electric signals of said first and second coils in the same electric phase.

4. A knock detecting apparatus according to claim 2, wherein said core means has parallelly extending first and second base portions extending perpendicular to the axis of said threaded portion and first and second side portions extending from respective one ends of said first and second base portions in the axial direction of said threaded portion, wherein said magnet means is positioned at the other ends of said first and second base portions of said core means, wherein said reed means comprises parallelly extending first and second permeable reeds of the same length having one ends secured to said magnet means and the other ends arranged to form the air gaps relative to the ends of said side portions of said core means respectively, and wherein said coil means comprises a first and second coils wound on said first and second base portions of said core means, said first and second coils being connected in series to each other to thereby add the electric signals of said first and second coils in the same electric phase.

5. A knock detecting apparatus according to claim 2, wherein said permeable reed means has a wedge shape at said the other end thereof, and wherein said permeable core means has a wedge portion at said the other end thereof.

* * * * *